(12) United States Patent
Tsai et al.

(10) Patent No.: US 9,185,395 B2
(45) Date of Patent: Nov. 10, 2015

(54) METHOD AND SYSTEM FOR AUTOMATICALLY ADJUSTING AUTOSTEREOSCOPIC 3D DISPLAY DEVICE

(71) Applicant: Quanta Computer Inc., Tao Yuan Shien (TW)

(72) Inventors: Wen-Lung Tsai, Bade (TW); Sheng-Xiong Chang, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 150 days.

(21) Appl. No.: 13/786,539

(22) Filed: Mar. 6, 2013

(65) Prior Publication Data

US 2014/0118318 A1 May 1, 2014

(30) Foreign Application Priority Data

Oct. 26, 2012 (TW) .............................. 101139676 A

(51) Int. Cl.
  *G06F 3/038* (2013.01)
  *H04N 13/04* (2006.01)
  *G02B 27/22* (2006.01)
(52) U.S. Cl.
  CPC ....... *H04N 13/0402* (2013.01); *H04N 13/0425* (2013.01); *G02B 27/225* (2013.01); *H04N 13/0468* (2013.01)
(58) Field of Classification Search
  USPC ................................................ 345/204, 207
  See application file for complete search history.

(56) References Cited

U.S. PATENT DOCUMENTS

| 6,115,058 | A | * | 9/2000 | Omori et al. ................. 348/45 |
| 6,816,158 | B1 | * | 11/2004 | Lemelson et al. ............ 345/419 |
| 2006/0061652 | A1 | * | 3/2006 | Sato et al. ................... 348/53 |
| 2011/0050864 | A1 | * | 3/2011 | Bond ............................ 348/51 |
| 2011/0261169 | A1 | * | 10/2011 | Tin ............................... 348/51 |
| 2013/0063422 | A1 | * | 3/2013 | Song ........................... 345/419 |
| 2014/0035959 | A1 | * | 2/2014 | Lapstun ....................... 345/690 |
| 2014/0092218 | A1 | * | 4/2014 | Xu et al. ....................... 348/46 |

FOREIGN PATENT DOCUMENTS

| CN | 101620816 A | 1/2010 |
| CN | 102724545 A | 10/2012 |

OTHER PUBLICATIONS

Vetro, S. Yea, and A. Smolic,"TowRD a 3D Video Format for Auto-Stereoscopic Displays," Mitsubishi Electric TR2008-057, Sep. 2008.
Taiwanese Office Action dated May 6, 2015.
Chinese Office Action dated May 4, 2015.

* cited by examiner

*Primary Examiner* — Jason Olson
*Assistant Examiner* — Sosina Abebe
(74) *Attorney, Agent, or Firm* — Rabin & Berdo, P.C.

(57) ABSTRACT

A method for automatically adjusting an autostereoscopic three-dimensional (3D) display device is provided. The method includes steps of: displaying an autostereoscopic 3D frame by the autostereoscopic 3D display device; capturing a left-eye frame and a right-eye frame of the autostereoscopic 3D frame by two image capturing devices located at a left-eye position and a right-eye position, respectively; selecting multiple sampling points from the left-eye and right-eye frames; and analyzing the number of the sampling points satisfying a predetermined condition to determine a display angle.

10 Claims, 4 Drawing Sheets

METHOD AND SYSTEM FOR AUTOMATICALLY ADJUSTING AUTOSTEREOSCOPIC 3D DISPLAY DEVICE

This application claims the benefit of Taiwan application Serial No. 101139676, filed Oct. 26, 2012, the subject matter of which is incorporated herein by reference.

BACKGROUND OF THE INVENTION

1. Field of the Invention

The invention relates in general to an automatic adjusting method and system, and more particularly to a method and system for automatically adjusting an autostereoscopic three-dimensional (3D) display device.

2. Description of the Related Art 3D display techniques are developed with progresses in display technologies. The 3D display technique is achieved through a design simulating left and right human eyes. Based on a certain level of parallax present between images perceived by left and right human eyes, a distance of an object perceived can be determined after analysis on the left-eye and right-eye images received by the brain.

In a type of 3D display technique, images can be filtered by special glasses to generate a parallax between left and right eyes to further construct a visual effect in a human brain.

In another type of 3D display technique, two frames are generated by using different polarization angles. The two frames are respectively focused at a left eye and a right eye, so as to construct a 3D visual effect in the brain. Such 3D display technique is referred to as an autostereoscopic 3D display technique. In the autostereoscopic 3D display technique, a display angle or polarization angle is correspondingly adjusted according to a distance between a user face and an autostereoscopic 3D display device, such that frames can be accurately focused at left and right eyes of the user. However, as minute errors of an assembly process of an autostereoscopic 3D display device are inevitable, the frames may fail to accurately focus at the left and right eyes of the user if the errors of the assembly process exceed beyond a tolerable range, such that the display quality of the autostereoscopic 3D display device can be severely affected.

SUMMARY OF THE INVENTION

The invention is directed to a method and system for automatically adjusting an autostereoscopic 3D display device. The method and system automatically adjusts the autostereoscopic 3D display device using a computing technique to not only enhance determination accuracy but also reduce human resource consumption.

According to an aspect the present invention, a method for automatically adjusting an autostereoscopic 3D display device is provided to determine an optimal display angle from multiple display angles. The method includes the following steps. An autostereoscopic 3D frame is displayed by an autostereoscopic 3D display device. At each of the display angles, a left-eye frame and a right-eye frame of the autostereoscopic 3D frame are captured by two image capturing devices located at a left-eye position and a right-eye position, respectively. Multiple sampling points corresponding to each of the display angles are selected from the left-eye frame and right-eye frame. The number of each set of the sampling points satisfying a predetermined condition is analyzed. The optimal display angle is selected according to the numbers satisfying the predetermined condition.

According to another aspect of the present invention, a system for automatically adjusting an autostereoscopic 3D display device is provided. The system automatically adjusts an autostereoscopic 3D display device to determine an optimal display angle from multiple display angles. The autostereoscopic 3D display device displays an autostereoscopic 3D frame. The system includes two image capturing devices and a processing device. At each of the display angles, the image capturing devices located at a left-eye position and a right-eye position capture a left-eye frame and a right-eye frame of the autostereoscopic 3D frame, respectively. The processing device selects sampling points corresponding to each of the display angles from the left-eye and right-eye frames, analyzes the number of each set of the sampling points satisfying a predetermined condition, and determines the optimal display angle according to the numbers satisfying the predetermined condition.

The above and other aspects of the invention will become better understood with regard to the following detailed description of the preferred but non-limiting embodiments. The following description is made with reference to the accompanying drawings.

DETAILED DESCRIPTION OF THE INVENTION

With the embodiments below, details of automatically adjusting an autostereoscopic 3D display device using a computing technique are described, so as to not only enhance determination accuracy but also reduce human resource consumption. It is to be understood that the embodiments are exemplary rather than limitations to the present invention. Further, a part of elements of the embodiments are omitted in the diagrams to better explain technical characteristics of the present invention.

Figure 1:
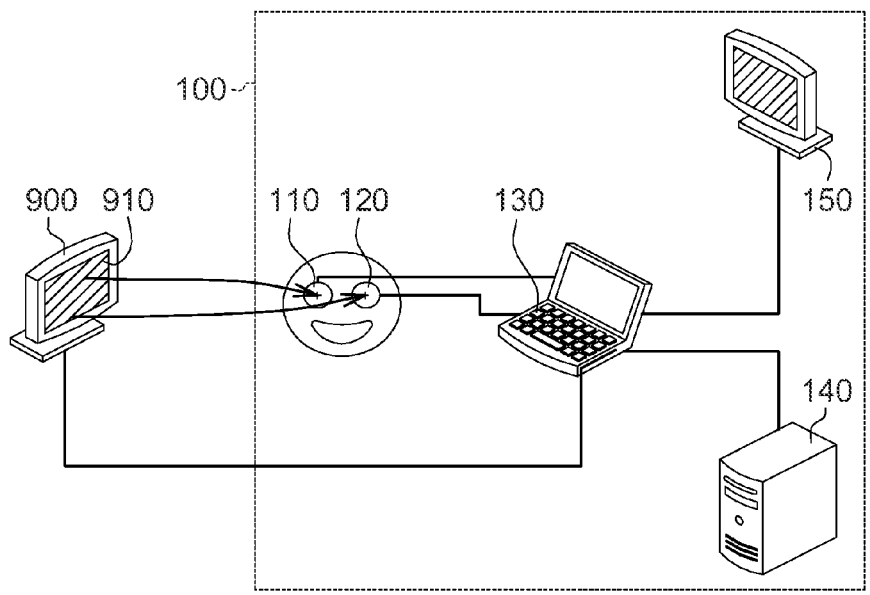
FIG. 1 is a schematic diagram of a system for automatically adjusting an autostereoscopic 3D display device according to one embodiment.

FIG. 1 shows a schematic diagram of a system 100 for automatically adjusting an autostereoscopic 3D display device 900. The system 100 is for automatically adjusting the autostereoscopic 3D display device 900. The autostereoscopic 3D display device 900 displays an autostereoscopic 3D frame 910. For example, based on a parallax barrier, the autostereoscopic 3D frame 910 presents two overlapping frames for left and right eyes respectively. After perceiving the two overlapping frames by naked left and right eyes, a 3D visual effect can be constructed in a human brain without requiring special headgear or glasses. The system 100 at least includes two image capturing devices 110 120 and a processing device 130. The image capturing devices 110 and 120 are for capturing images, and may be a video camera, a camera or a photographing lens. The processing device 130 is for performing various operations and control procedures, and may be a computer, a processing chip, a firmware circuit or a storage medium storing multiple codes.

In one embodiment, the system 100 for automatically adjusting the autostereoscopic 3D display device 900 may further include a server device 140 and a display device 150. The server device 140 is for storing data of the adjustment process, and may be a server, a hard drive, a memory card or a memory. The display device 150 is for displaying various kinds of data during the adjustment process, and may be a display screen or a printer.

In one embodiment, the image capturing devices 110 and 120, the processing device 130, the server device 140 and the display device 150 may be independent electronic devices that communicate with one another through a wired transmission line or wireless signals. In another embodiment, the image capturing devices 110 and 120, the processing device 130, the server device 140 and the display device 150 may be integrated into one single electronic device, e.g., a laptop computer or smart phone having powerful functions, and communicate with one another through a wire of a printed circuit board.

Figure 2:
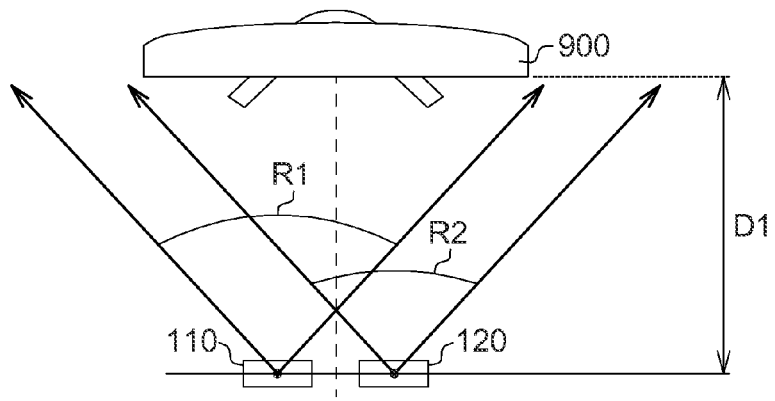
FIG. 2 is a schematic diagram depicting relations between an autostereoscopic 3D display device and image capturing devices according to one embodiment.

FIG. 2 shows a schematic diagram depicting relations between the autostereoscopic 3D display device 900 and the image capturing devices 110 and 120. The autostereoscopic 3D display device 900 is located from the image capturing devices 110 and 120 at a predetermined distance D1, such that the autostereoscopic 3D display device 900 completely falls within visual angles R1 and R2 of the image capturing devices 110 and 120. Thus, the image capturing devices 110 and 120 are allowed to capture the complete autostereoscopic 3D frame 910 (shown in FIG. 1). In one embodiment, the predetermined distance D1 is a distance selected by a majority of users for viewing the autostereoscopic 3D frame 910.

Figure 3A:
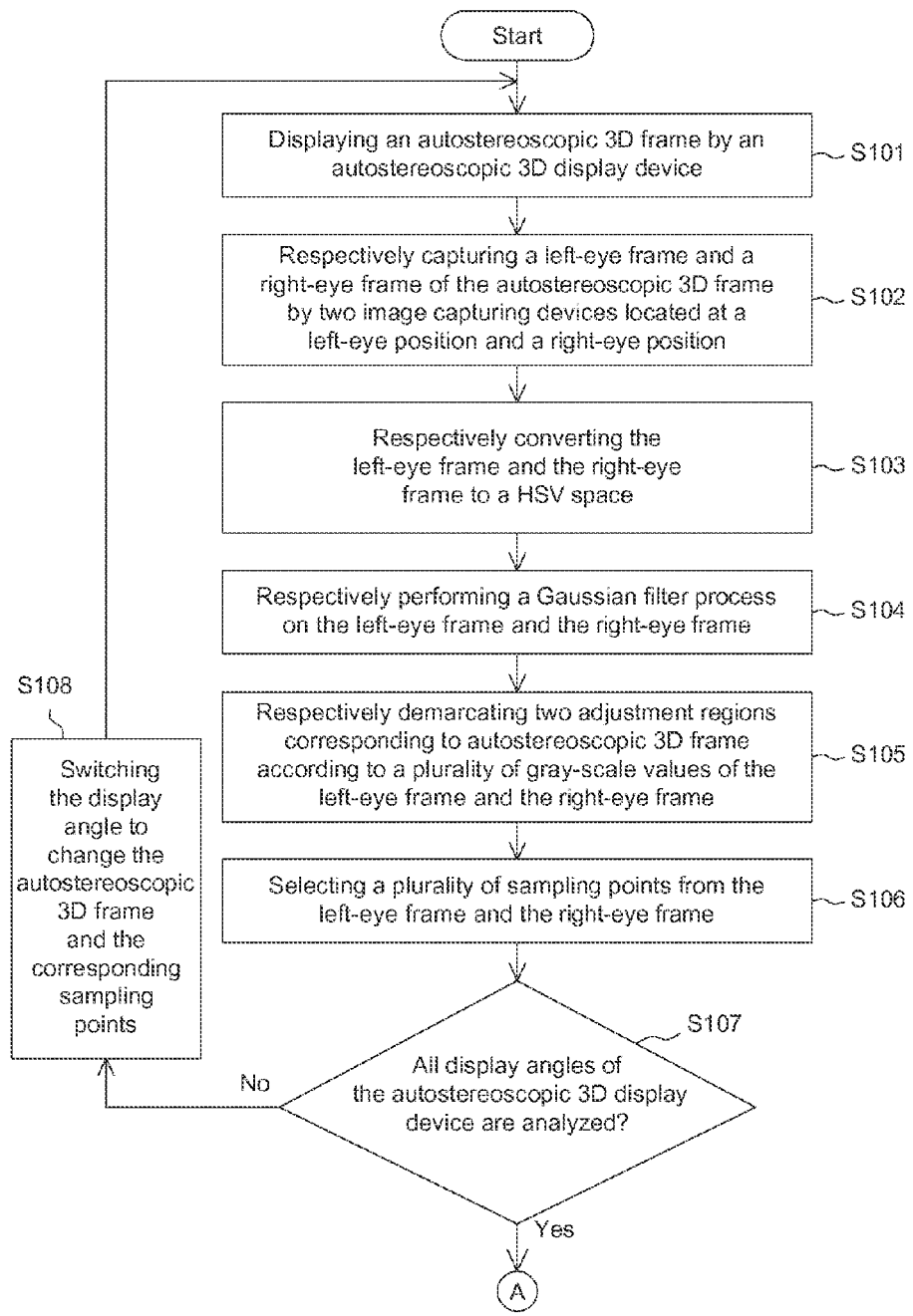
FIGS. 3A and 3B are flowcharts of a method for automatically adjusting an autostereoscopic 3D display device according to one embodiment.
Figure 3B:
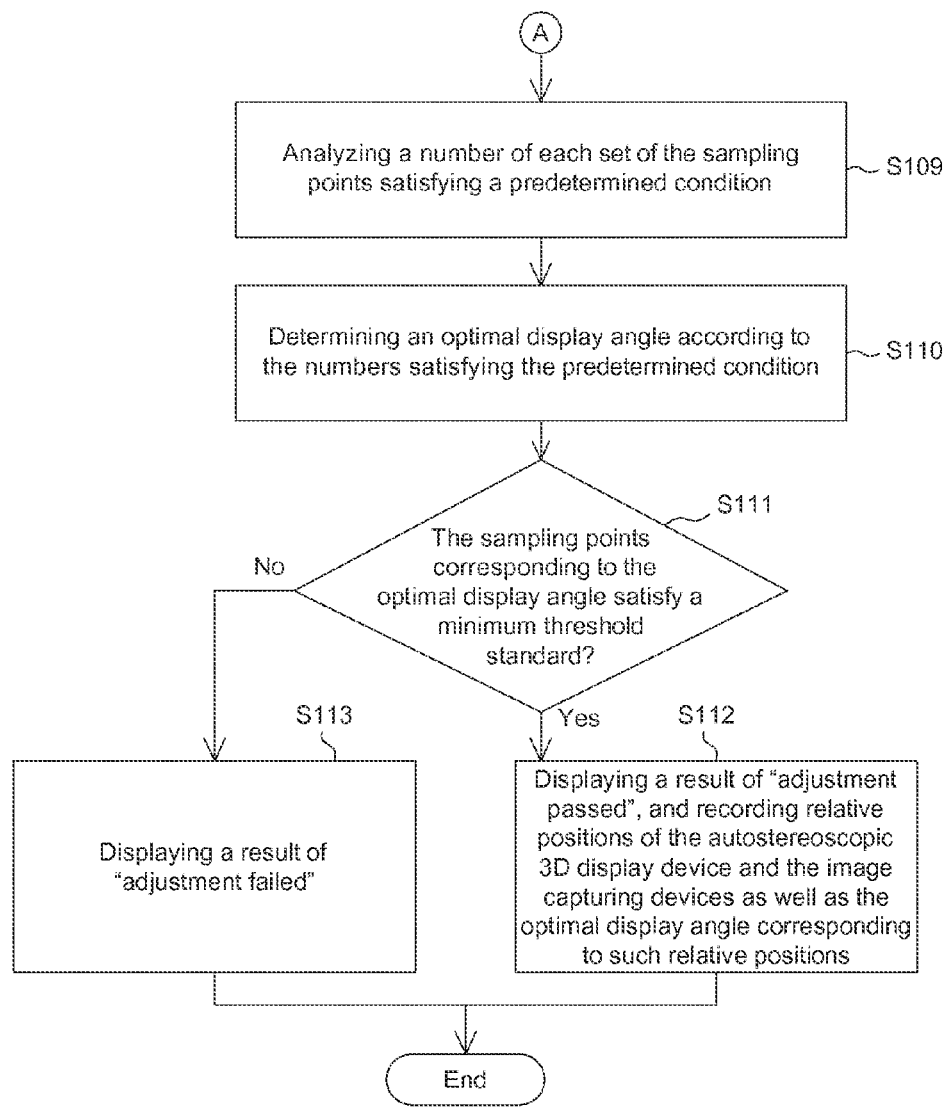

FIGS. 3A and 3B are flowcharts of a method for automatically adjusting the autostereoscopic 3D display device 900 according to one embodiment. Details of the method according to one embodiment are described with reference to the flowcharts. In the method in FIGS. 3A and 3B, the system 100 in FIG. 1 for automatically adjusting the autostereoscopic 3D display device 900 is taken as an example.

In step S101, the autostereoscopic 3D frame 910 is displayed by the autostereoscopic 3D display device 900. The autostereoscopic 3D frame 910 corresponds to a display angle or polarization angle. Color blending may occur if corresponding to different display angles for the autostereoscopic 3D frames 910 (i.e. some pixels of one overlapping frame would be perceived by naked eye into the other overlapping frame). In the following steps, an optimal display angle can be determined to compensate effects resulted by assembly errors to present an optimal autostereoscopic 3D frame 910.

Figure 4:
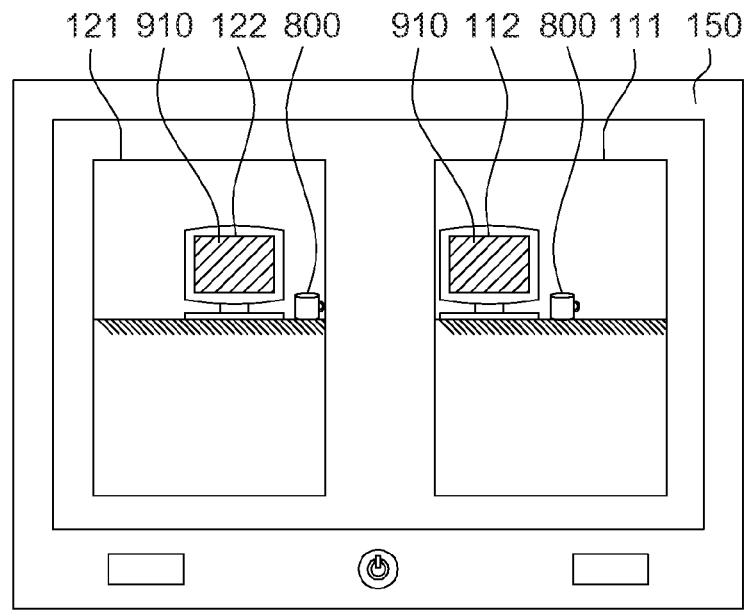
FIG. 4 is a schematic diagram of a left-eye frame and a right-eye frame.

FIG. 4 shows a schematic diagram of a left-eye frame 111 and a right-eye frame 121. In step S102, the left-eye frame 111 and the right-eye frame 121 of the autostereoscopic 3D frame 910 are captured by the image capturing devices 110 and 120 located at a left-eye position and a right-eye position, respectively. The left-eye frame 111 and the right-eye frame 121 may be temporarily stored in the server device 140. In one embodiment, the two image capturing devices 110 and 120 are configured to have the same image resolution, focal distance, aperture, shutter and field of depth.

In step S103, the processing device 130 converts the left-eye frame 111 and the right-eye frame 121 to a hue-saturation-value (HSV) space respectively. In this step, the processing device 130 may perform the conversion with respect to each of the pixels in the left-eye frame 111 and the right-eye frame 121.

In step S104, the processing device 130 further respectively performs a Gaussian filter process on the left-eye frame 111 and the right-eye frame 121 to reduce effects of noises during the adjustment process.

In step S105, the processing device 130 respectively demarcates two adjustment regions 112 and 122 corresponding to the autostereoscopic 3D frame 910 according to a plurality of gray-scale values of the left-eye frame 111 and the right-eye frame 121. More specifically, although the left-eye frame 111 and the right-eye frame 121 are obtained through actual capturing, the left-eye frame 111 and the right-eye frame 121 may still contain certain background objects (e.g., a cup 800) that are irrelevant to the present invention, and so the irrelevant background objects are desired to be eliminated from the left-eye frame 111 and the right-eye frame 121. Further, since the gray-scale values of the autostereoscopic 3D frame 910 are usually higher than that of the background objects, the processing device 130 may respectively demarcate the regions having higher gray-scale values (through step S103) to serve as the adjustment regions 112 and 122, which represent the autostereoscopic 3D frame 910 perceived by the user.

Figure 5:
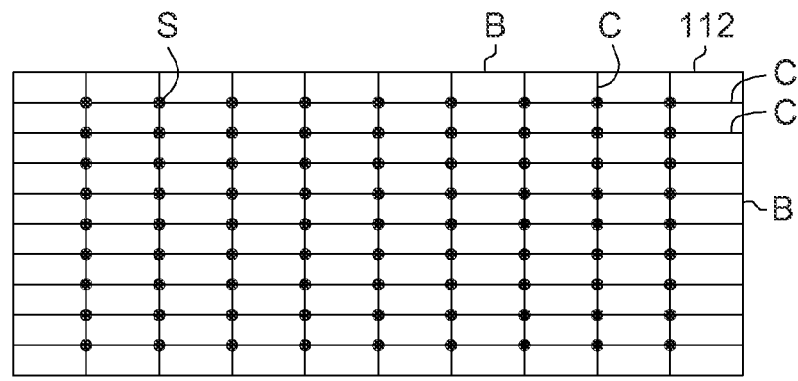
FIG. 5 is a schematic diagram of sampling points in an adjustment region according to one embodiment.

In step S106, the processing device 130 selects multiple sampling points S from the left-eye frame 111 and the right-eye frame 121. The selected sampling points S are located within the adjustment regions 112 and 122. FIG. 5 shows a schematic diagram of the sampling points S in the adjustment region 112. In one embodiment, for example, the adjustment region 112 may be divided into several equal rectangular regions by several dividing lines C, and intersections of the dividing lines C may serve as the sampling points C. Intersections of borders B of the adjustment region 112 and the dividing lines C are not selected as the sampling points S. That is to say, the sampling points S may be selected through an averaged distribution approach. In an alternative embodiment, the sampling points S may be selected according to a density increasing outwardly or decreasing outwardly from a center of the adjustment region 112.

In step S107, the processing device 130 determines whether all of the display angles of the autostereoscopic 3D display device 900 are analyzed by the foregoing steps S101 to S106. Step S108 is performed when there are more display angles to be analyzed, or else step S109 is performed when all of the display angles are analyzed.

In step S108, the processing device 130 switches the display angle to change the autostereoscopic 3D frame 910. Steps S101 to S106 are repeated to select the corresponding sampling points S.

In environment without assembly errors and corresponding to a correct display angle of an appropriate distance, the left-eye frame 111 and the right-eye frame 121 respectively captured from the autostereoscopic 3D frame 910 are monochromatic (i.e. the two overlapping frames for left and right eyes are set monochromatic), e.g., all pixels in the left-eye frame 111 are blue, or all pixels in the right-eye frame 121 are green. However, in an environment with assembly errors, color blending may exist in the left-eye frame 111 and the right-eye frame 121, e.g., a part of the pixels in the left-eye frame 111 are blue and green, and a part of the pixels in the right-eye frame 121 are blue and red. Thus, the display angle needs to be adjusted to preferably present all the pixels in the left-eye frame 111 and the right-eye frame 121 approximating monochromatic. To determine the display angle for presenting the left-eye frame 111 and the right-eye frame 121 approximating monochromatic, in step S109, the number in each set of sampling points S (the sampling points corresponding to each of the display angles) satisfying a predetermined condition is analyzed. For example, the predetermined condition is a range of hue, saturation or value.

For example, among 162 sampling points S captured at the first display angle, the number of sampling points S satisfying the predetermined conditions is 72; among 162 sampling points S captured at the second display angle, the number of sampling points S satisfying the predetermined conditions is 150; and among 162 sampling points S captured at the third display angle, the number of sampling points S satisfying the predetermined conditions is 110.

In step S110, the processing device 130 determines the optimal display angle according to the numbers satisfying the predetermined condition. Taking the above example for instance, the number satisfying the predetermined condition is the largest under the second display angle, and so the second display angle is determined as the optimal display angle. In this step, the display angle is determined according to a relative standard.

In step S111, the processing device 130 determines whether the sampling points S corresponding to the optimal display angle satisfy a minimum threshold standard. For example, the minimum threshold standard is that the number satisfying the predetermined condition S is at least 150. In this step, the display angle is determined according to an absolute standard. Step S112 is performed when the sampling points S of the optimal display angle satisfy the minimum threshold standard, or else step S113 is performed when the sampling points S of the optimal display angle does not satisfy the minimum threshold standard.

In step S112, the display device 150 displays a result of "adjustment passed", and records relative positions of the autostereoscopic 3D display device 900 and the image capturing devices 110 and 120 as well as the optimal display angle corresponding to such position relations. After the autostereoscopic 3D display device 900 is adjusted, the autostereoscopic 3D display device 900 is automatically adjusted to an appropriate display angle without any parallax regardless of how a relative position of a viewer changes.

In step S113, the display device 150 displays a result of "adjustment failed".

With the system 100 and the method for automatically adjusting the autostereoscopic 3D display device 900 described in the above embodiments, the autostereoscopic 3D display device 900 can be adjusted to an most precise display angle as well as eliminating the autostereoscopic 3D display device 900 that does not satisfy the minimum threshold standard of the product. In the automatic adjustment process, the steps of image capturing, demarcating the adjustment regions 112 and 122, selecting the sampling points and determining the optimal display angle are performed by a computing technique rather than through manual operations and objective judgment, thereby significantly enhancing determination accuracy and reducing human resource consumption.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for automatically adjusting an autostereoscopic 3D display device, for determining an optimal display angle from a plurality of display angles, the method comprising:
    displaying an autostereoscopic 3D frame by the autostereoscopic 3D display device;
    at each of the display angles, capturing a left-eye frame and a right-eye frame of the autostereoscopic 3D frame by two image capturing devices located at a left-eye position and a right-eye position, respectively;
    selecting a plurality of sampling points corresponding to each of the display angles from the left-eye frame and the right-eye frame;
    analyzing a number of the sampling points satisfying a predetermined condition;
    selecting the optimal display angle according to the number satisfying the predetermined condition; and
    determining whether the sampling points corresponding to the optimal display angle satisfy a minimum threshold standard.

2. The method according to claim 1, further comprising:
    converting the left-eye frame and the right-eye frame to a hue-saturation-value (HSV) space respectively.

3. The method according to claim 2, further comprising:
    demarcating two adjustment regions corresponding to the autostereoscopic 3D frame according to a plurality of gray-scale values of the left-eye frame and the right-eye frame respectively.

4. The method according to claim 3, wherein the selected sampling points are within the adjustment regions.

5. The method according to claim 1, further comprising:
    performing a Gaussian filter process on the left-eye frame and the right-eye frame respectively.

6. A system for automatically adjusting an autostereoscopic 3D display device, for determining an optimal display angle from a plurality of display angles, the system comprising:
    two image capturing devices, for capturing a left-eye frame and a right-eye frame of the autostereoscopic 3D frame at a left-eye position and a right-eye position at each of the display angles, respectively;
    a processing device, for selecting a plurality of sampling points corresponding to each of the display angles from the left-eye frame and the right-eye frame, analyzing a number of the sampling points satisfying a predetermined condition, and selecting the optimal display angle according to the number satisfying the predetermined condition;
    wherein the processing device further determines whether the sampling points corresponding to the optimal display angle satisfy a minimum threshold standard.

7. The system according to claim 6, wherein the processing device further converts the left-eye frame and the right-eye frame to an HSV space respectively.

8. The system according to claim 7, wherein the processing device further demarcates two adjustment regions corresponding to the autostereoscopic 3D frame according to a plurality of gray-scale values of the left-eye frame and the right-eye frame respectively.

9. The system according to claim 8, wherein the selected sampling points are within the adjustment regions.

10. The system according to claim 6, wherein the processing device further performs a Gaussian filter process on the left-eye frame and the right-eye frame respectively.

* * * * *